Nov. 7, 1967  A. A. ACHKIO  3,351,001
PRELIMINARY PRESSING OF BENT GLASS LAMINATED ASSEMBLIES
Filed April 5, 1965  5 Sheets-Sheet 2
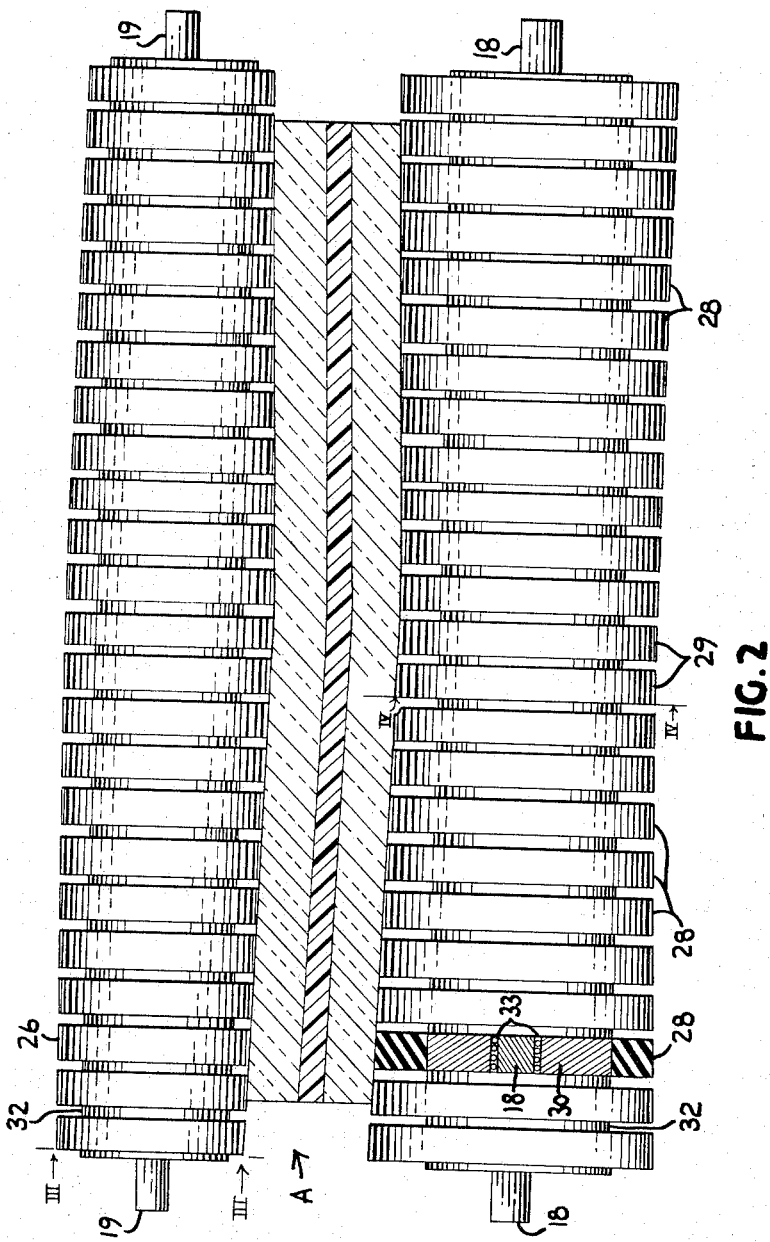
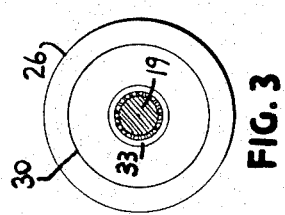
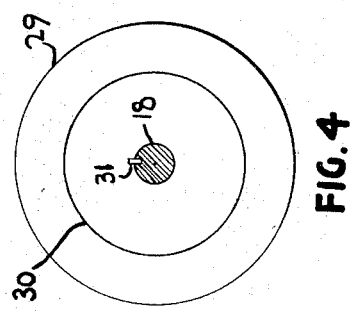
INVENTOR
ANTHONY A. ACHKIO
ATTORNEYS United States Patent Office 3,351,001
Patented Nov. 7, 1967

3,351,001
PRELIMINARY PRESSING OF BENT GLASS LAMINATED ASSEMBLIES
Anthony A. Achkio, Natrona Heights, Harrison Township, Pa., assignor to Pittsburgh Plate Glass Company, Pittsburgh, Pa., a corporation of Pennsylvania
Filed Apr. 5, 1965, Ser. No. 445,338
6 Claims. (Cl. 100—176)

ABSTRACT OF THE DISCLOSURE

Apparatus for roller pressing curved glass plastic assemblies to prepare the assemblies for final autoclave lamination comprising a pair of parallel shafts mounted for rotation on spaced roll support members, each shaft carrying a series of resilient rings of different diameter along the length of each shaft so that their assembly engaging peripheries conform to the shape of the upper and lower curved surfaces of the assembly passing between the rolls.

This invention relates to preliminary pressing of bent glass laminated assemblies comprising two matched sheets of curved glass and a thermoplastic interlayer. Such preliminary pressing is necessary to prepare the assemblies for the final step of the laminating process, exposure to high temperature and pressure in an autoclave.

In the manufacture of laminated windshields comprising a pair of matched sheets of curved glass and a thermoplastic interlayer, it is desirable to obtain a complete adhesive bond between the glass sheet and the thermoplastic interlayer. This complete adhesive bond is obtained commercially by subjecting the assembled glass and plastic sheets to heat and pressure while immersed in a hot oil bath while within an autoclave. Unless the marginal edges of the laminated assemblies are sealed by bonding the glass to the thermoplastic interlayer before the assembly is exposed to the oil bath, the oil in the autoclave may penetrate between the two sheets of glass and the interlayer. The assembly being laminated is discolored in the portion where oil penetration takes place.

In preparing assemblies for the autoclave, two sheets of glass and a plastic interlayer are assembled in the form of a sandwich. The sandwich is heated and subjected to a preliminary pressing by passing the sandwich between one or more pairs of nipper rolls formed of resilient, yet frictional contacting material that engages the outer surfaces of the assembly to be laminated. As the sandwich passes through the nipper rolls, the air entrapped between the layers of the assembly is forced out. This preliminary pressing sometimes followed by edge rolling of the margin of the plastic interlayer before the latter cools to room temperature, provides a sufficient seal extending over the entire marginal area of the assembly to prevent oil penetration and the resulting discoloration when the assembly is subjected to its final pressing operation in the oil autoclave.

The manufacture of bent or curved laminated windshield, particularly those bent both about the transverse axis and about the longitudinal axis thereof has caused the glass laminating art considerable concern.

Nipper rolls have been mounted in pairs to a roll housing. Roll housing have been made to follow complicated movement in order to make the nipper rolls capable of following the curvature of the assembly about its transverse axis when the assembly is conveyed through the nipper rolls in the direction of its length.

For example, a pair of rolls have been mounted on a common roll support housing for pivoting to a position so that the line of contact between the rolls is approximately parallel to the plane tangent to the leading edge of the glass. As the curved sandwich is seized between the rolls, it is driven through the rolls and subjected to pressure to expel the air from between the layer making up the sandwich. As the sandwich moves through the rolls, its center of gravity moves forward, thus tending to rotate the roll housing and the line of contact with the opposite surfaces of the curved assembly. Eventually, the roll housing rotates so that the line of contact with the glass is tilted beyond the horizontal to an oblique upward position conforming to the rear or trailing edge of the assembly passing through. Gas entrapped within the assembly is forced out through the trailing edge by such nipper rolls. A typical pivotal roll housing is shown in U.S. Patent No. 2,673,168 to Pascoe et al.

It has been considered necessary by the curved glass laminating art to complicate the structure of the nipper roll aparatus still further in order to accommodate for transverse sag or a transverse component of curvature about an axis extending lengthwise of the path of movement taken by the assembly through the nipper rolls. Examples of complicated structures are shown in U.S. Patent No. 2,525,980 to Walters and U.S. Patent No. 2,983,635 to Richardson. The nipper rolls of these structures are segmented with each pair of opposed segments movable as a unit to conform to the curvature of the localized glass portion engaged thereby.

Such complicated structures have pressed glass-plastic assemblies with some success. However, their numerous moving parts have complicated their maintenance and have caused more breakdowns than would be the case with more simplified structure. While the need to laminate assemblies curved about two axes angularly disposed relative to each other has existed for over a decade and the art kept developing complicated roll structure for prepressing operations, the art failed to meet the recognized need for a relatively simple structure for prepressing curved glass-plastic sandwiches using nipper rolls.

It is an object of the present invention to provide a simplified pressing apparatus for pressing curved glass-plastic assemblies that have a compound curvature, namely, that are bent about both the longitudinal and transverse axes thereof, or that have a cross sag transverse to their main curvature, to prepare said assemblies for final lamination in an oil autoclave.

The above and other objects will be obvious in the light of a description of a preferred embodiment of the present invention which follows.

In the drawings which form part of the description and wherein like reference numbers refer to like structural elements, FIG. 1 is an assembly view showing how the rolls are employed in one type of glass pressing apparatus;

FIG. 2 is an exploded sectional view of a pair of rolls constructed according to the present invention, showing how the rolls are mounted about a pair of parallel shafts to conform to the cross sag of assemblies comprising glass sheets conveyed therethrough for prepressing;

FIGS. 3 and 4 are cross-sectional views taken along lines III—III and IV—IV, respectively, of FIG. 2, FIG. 3 showing how certain roll segments are mounted for free rotation and FIG. 4 showing how other roll segments are keyed to rotate with their respective shafts;

Figure 1:
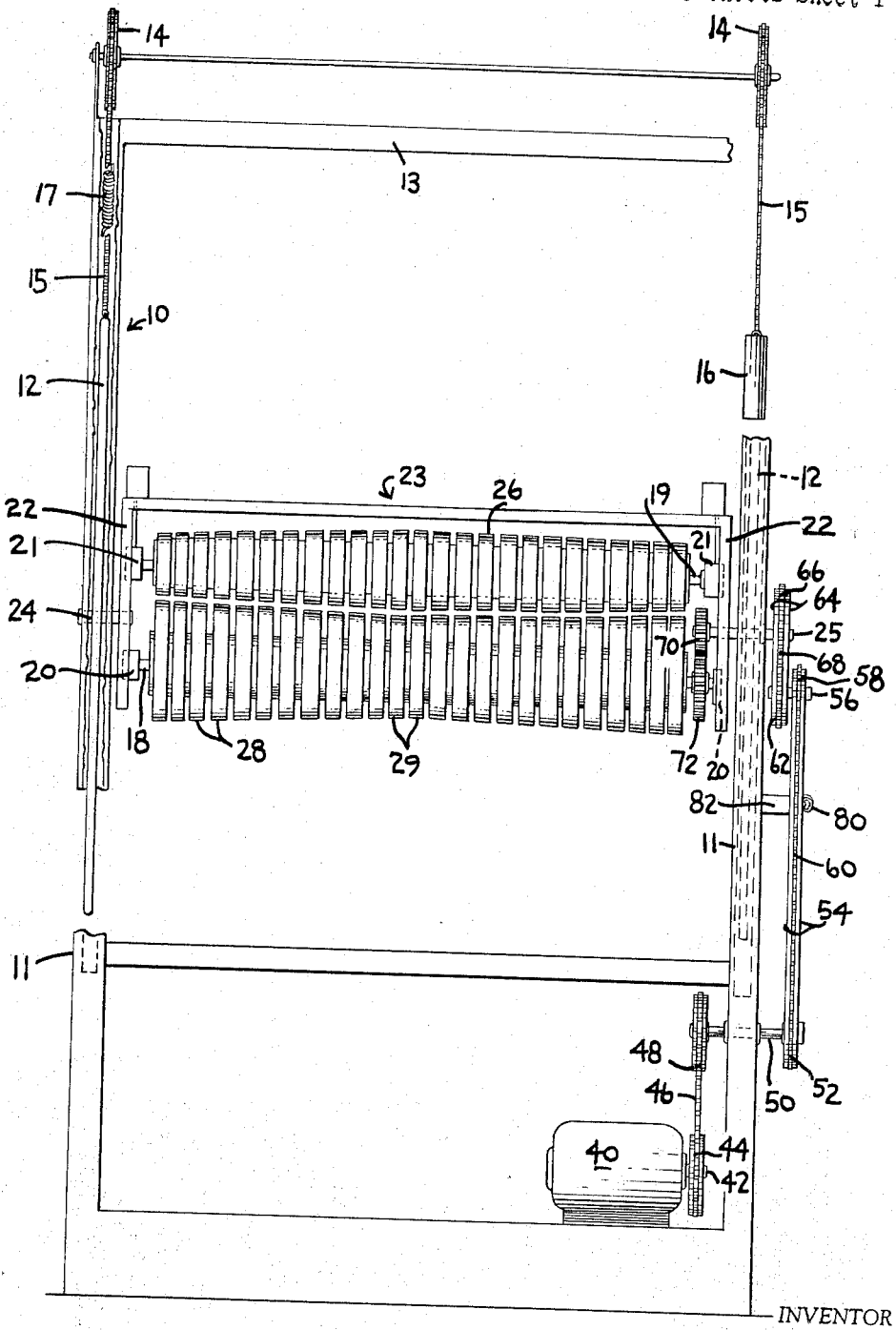
Figure 5A:
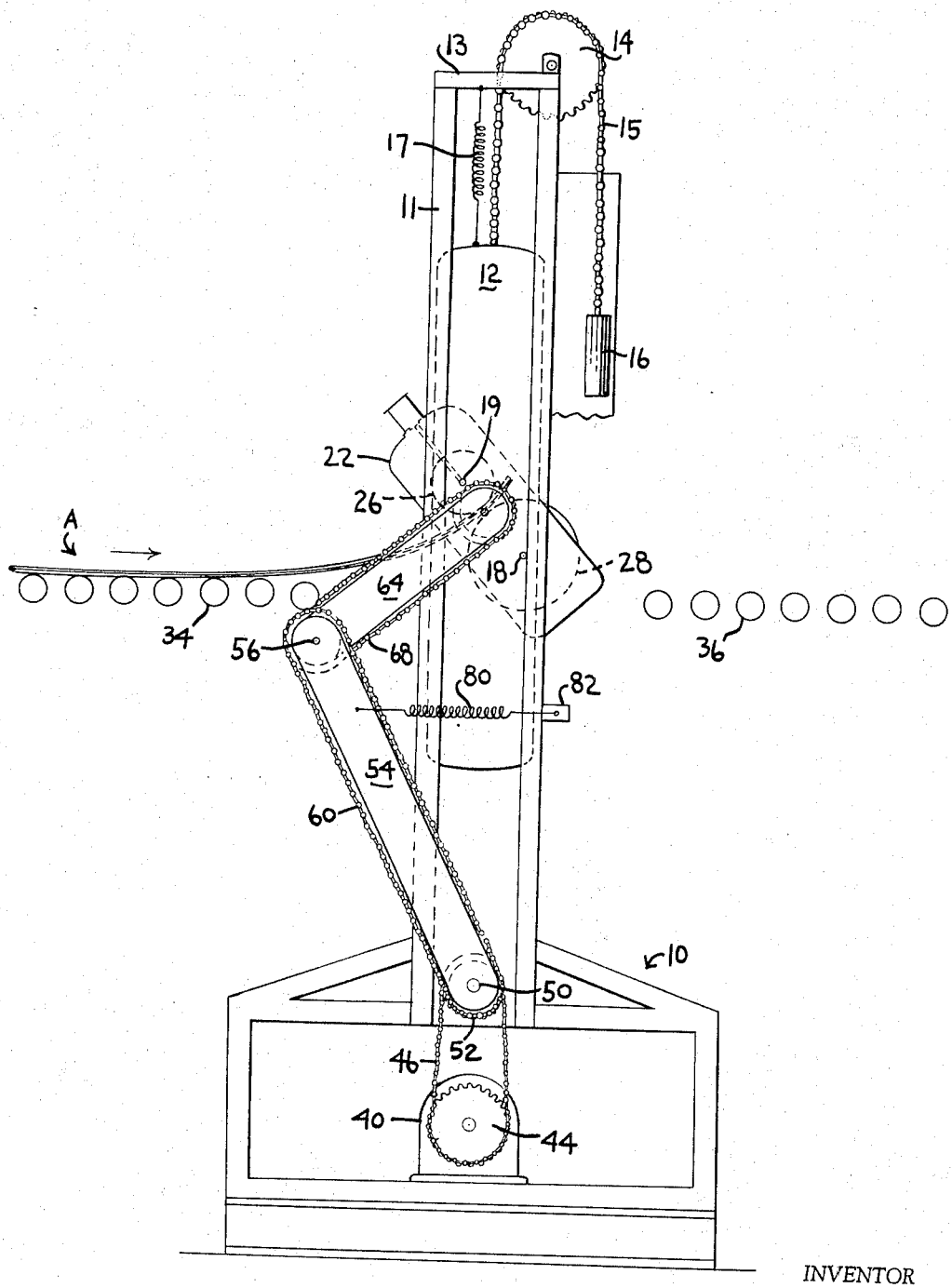
Figure 5B:
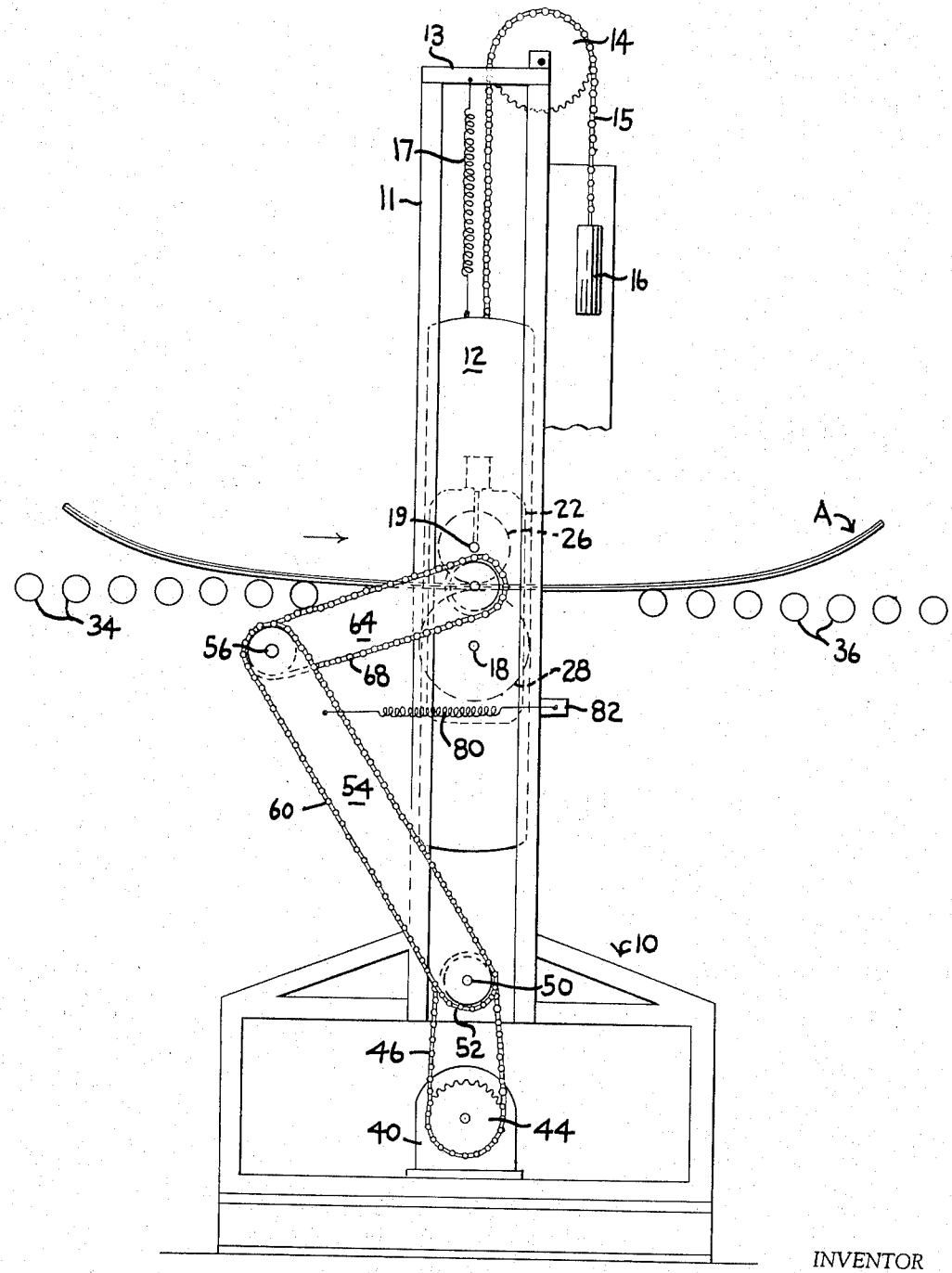
Figure 5C:
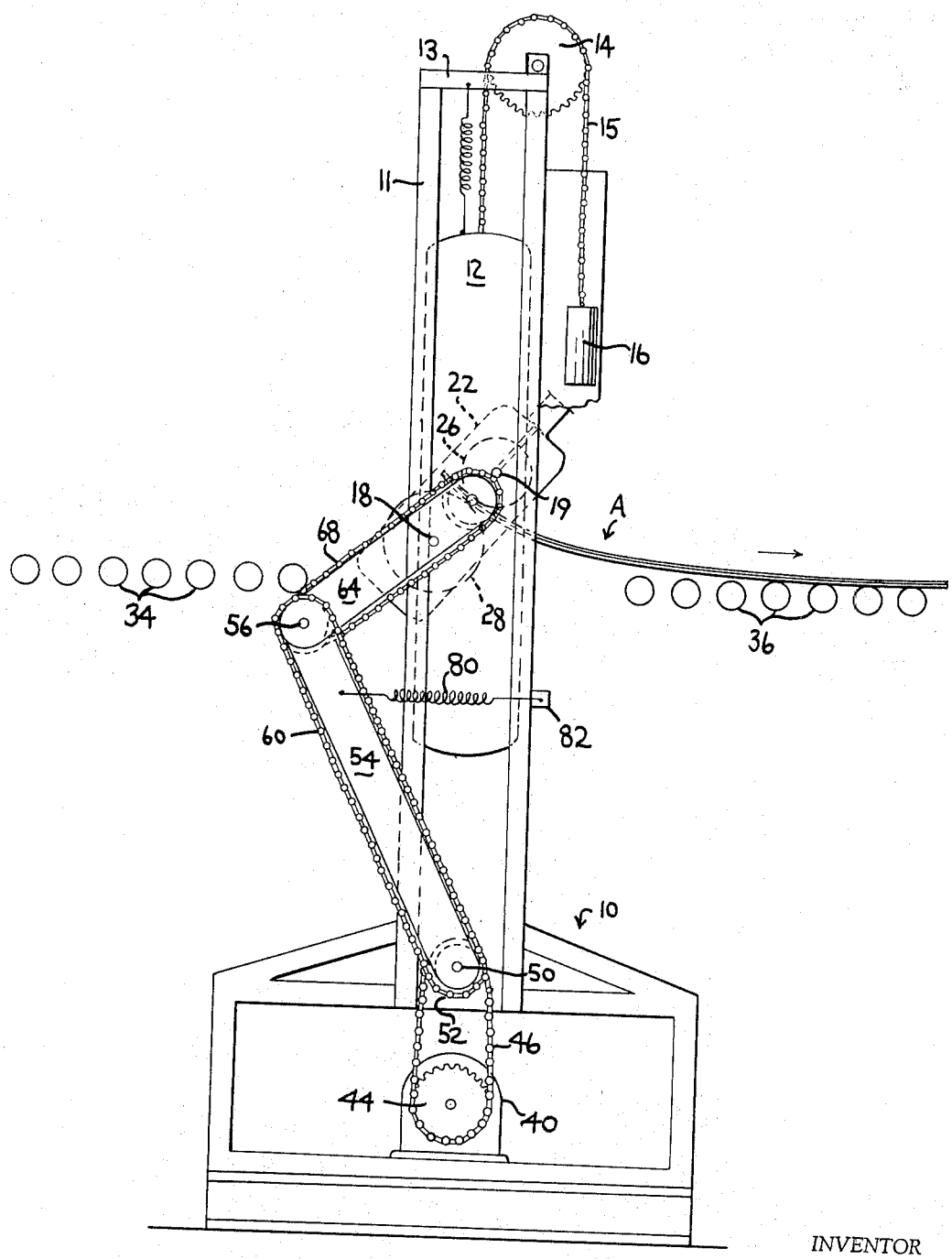

FIGS. 5A, 5B, and 5C are simplified end views of the assembly of FIG. 1, showing how the rolls are oriented and positioned relative to different portions of a curved assembly being conveyed therebetween for prepressing.

The drawings show a support frame 10 comprising two sets of vertical guide rails 11, each set supporting a plate 12 for vertical movement. A horizontal cross beam 13 interconnects the upper ends of the vertical guide rails 11. A sprocket 14 is supported on each end of beam 13 and has a chain 15 entrained thereover. One end of the chain is attached to the upper end of plate 12. The other end of chain 15 carries a weight 16. A vertical tension spring 17 is also connected between each plate 12 and the horizontal cross beam 13.

A lower shaft 18 and an upper shaft 19 are journaled at their ends in lower and upper bearing housings 20 and 21, respectively. The latter are carried on vertical walls 22 of a bracket 23. The bracket is pivotally mounted to plates 12 by stub pivot rods 24 and 25.

The upper shaft 19 is mounted parallel to the lower shaft 18. Each of the shafts 18 and 19 has mounted therearound a set of rings or resilient roll segments having resilient peripheral surfaces. The upper set of rings is denoted generally by reference character 26, whereas the rings in the lower set are depicted by reference number 28, except for centermost rings 29.

Each of the rings 26, 28, and 29 is molded around a brass sleeve 30. The sleeve 30 about which the two centermost rings 29 are fixed is engaged with the lower shaft 18 by a key 31 to cause rings 29 to rotate with the latter shaft.

Each of the rings 26, 28, and 29 is separated by a washer 32 of ¼ inch thickness. The washers 32 make bearing contact with sleeves 30. Roller bearings 33 permit sleeves 30 for rings 26 and 28 to rotate freely with their molded rings 26 and 28 about their respective shafts 18 and 19.

The resilient rings 26, 28, and 29 are preferably made of rubber or other material to have a resilient, yet frictional contacting peripheral surface that engages one of the outer surfaces of an assembly A to be laminated. According to the present invention, the individual rings are arranged according to size so as to provide axially of the shafts 19 and 88 a shape conforming generally to the transverse sag of the glass sheets of the assembly A undergoing prepressing.

Rings 28 and 29 disposed along the lower shaft 18 are so arranged that their diameter decreases generally from the ends of the shaft toward the center. The diameter of rings 26 disposed along the upper shaft 19 decreases in a direction toward the adjacent end of upper shaft 19. The upper configuration of the peripheries of the lower rings 28 and 29 in the direction of lower shaft 18 is of concave elevation conforming substantially to the cross sag in the assembly A.

The distance between the outer peripheries of opposed rings mounted on the central portion of shafts 18 and 19 is sufficiently small to permit the rings 26, 28, and 29 to frictionally engage the opposite surfaces of a curved assembly passing therethrough.

The rings disposed centrally along the upper shaft 19 are preferably of cylindrical configuration with their outer perimeter parallel to the axis of the shaft on which they are mounted. The rings 26 to either side of the centrally disposed rings are frusto conical with their diameters decreasing slightly toward the adjacent end of upper shaft 19.

The rings 29 mounted centrally of the lower shaft 18 are cylindrical with at least some of the flanking rings 28 frusto conical. The outer peripheries of the latter gradually increase in diameter from their axially inner to their axially outer ends. However, the rings 26 mounted along upper shaft 19 decrease in diameter from center to end a slightly greater amount than the increase in diameter from center to end of the rings of the lower set mounted on the lower shaft 18.

This configuration causes the distance between the outer periphery of the opposed centrally disposed rings to be less than the distance between the outer periphery of opposed rings mounted at the ends of the shafts. This enables the rolling apparatus to grip the central portion of a glass assembly to be pressed securely and firmly and permits for variations of transverse sagging to an extent limited by the difference in distance between the opposed rings of the upper and lower set of rings.

In addition, this configuration of spacing between the upper rings and the lower rings causes a pressure gradient from center to ends of the assembly passing between the rings. This pressure gradient helps force some of the gas entrapped between the laminae of the curved assembly out from the side edges of the assembly and reduces the amount of entrapped gas that must be forced out the rear edge of the assembly as in conventional roll pressing.

Another factor which permits flexibility of use of the roll apparatus is the provision of relatively hard rings centrally and relatively soft rings in the end regions. For example, the two driving rings 29 mounted centrally of the lower shaft 18 and attached thereto through keys 31 are made of relatively hard rubber, for example, 45 to 50 Shore durometer, and the upper rolls mounted on the upper shaft 16 in opposition to the two rings 29 are also of approximately the same relatively hard durometer. The remaining rings 26 and 28 mounted on both shafts, which are all freely rotatable, are of softer rubber, preferably 30 to 35 Shore durometer. The relatively hard rings disposed in the central portions of the shafts 18 and 19 establish the vertical plane of support for the central portion of the assembly passing through the nipper roll apparatus. The relatively soft rings on opposite sides of the driving rings are yieldable to conform to any slight variation in cross sag of assemblies being processed.

While the present invention is limited to the suggested configuration for mounting rings of different diameter on parallel shafts to support the assembly substantially entirely across its width and in the choice of relative hardness of the rings used, and in the configuration of spacing therebetween, a complete description of a preferred embodiment of pressing apparatus will be described for purpose of supplying a complete disclosure.

In FIGS. 5A, 5B, and 5C, the prepressing apparatus is shown in its usual environment including a delivery conveyor 34 which orients, aligns, and delivers curved glass-plastic assemblies A from a furnace (not shown) to the pressing apparatus supported in frame 10, and a discharge conveyor 36 which removes a preliminarily pressed assembly A from the pressing apparatus for further disposition.

Driving mechanism for the prepressing apparatus is furnished by a motor 40 to the lower shaft 18 through a motor drive shaft 42, a sprocket 44 fixed to the motor drive shaft 42, a chain drive 46, another sprocket 48 coupled to sprocket 44 by chain drive 46, a drive shaft 50 fixed to sprocket 48, another sprocket 52 fixed to drive shaft 50, a pair of parallel members 54, a stub rod 56 extending through members 54, a sprocket 58 fixed to stub rod 56, a chain drive 60 interconnecting sprockets 52 and 58 and entrained for movement parallel to and substantially coextensive with members 54, another sprocket 62 fixed to stub rod 56, another pair of parallel members 64 pivotally mounted between stub rod 56 and stub pivot rod 25, another sprocket 66 fixed to stub pivot rod 25, a chain 68 connecting sprockets 62 and 66 and entrained for movement parallel to and substantially coextensive with members 64, a gear 70 rigidly mounted on pivot rod 25 and an additional gear 72 mounted rigidly on lower shaft 18 in radial alignment with gear 70.

Members 54 and 64 serve as holders for chains 60 and 68. Stub rod 56 provides a jointed connection between members 54 and 64, permitting vertical movement of plates 12 in response to movement of the nip between the upper rings 26 and the lower rings 28 and 29 following the shape of the portion of an assembly A passing between the rolls. At the same time, motor 40 continues to drive lower shaft 18 and its rubber rings 29 keyed thereto during vertical movement of the rolls responsive to vertical movement of the plates 12 in vertical guides 11.

A horizontal tension spring 80 interconnects one of the members 54 to a bracket 82 on frame 10 in such a manner that it tends to straighten out the jointed connection between members 54 and 64. Thus, horizontal tension spring 80 cooperates with vertical tension spring 17 to resist too rapid a change in vertical position of the nip between the upper and lower sets of resilient rings.

In operation, the vertical walls 22 of bracket 23 are oriented initially about stud pivot rods 24 and 25 in the manner shown in FIG. 5A. The bracket 23 and its supported shafts and resilient rings are held at an appropriate vertical position by weights 16 and springs 17 and 80 so that the leading edge of a curved assembly A enters the nip between the upper rings 26 and the lower rings 28 and 29. Driven rings 29 are rotated in a clockwise direction as seen in FIG. 5A by motor 40 to force the assembly A by friction from left to right through the nip between the resilient rings 26 and 28, 29.

As the assembly A moves from left to right between the rings, the nip between the rings follows the contour of the glass to rotate the bracket 23 relative to plates 12 and to cause the latter to move vertically within vertical guide rails 11. Members 54 and 64 change their angle of jointure to accommodate for the change in vertical disposition of the plates they follow. The smallest interior angle of jointure between the members occur when the rolls engage the lowest portion of the assembly A as seen in FIG. 5B.

As the center of gravity of the assembly A moves to the right of the resilient upper rings 26 and lower rings 28 and 29, vertical walls 22 of bracket 23 rotates to the position shown in FIG. 5C and the plates 12 move upward.

After the assembly A leaves the nip between the rings, continued rotation of the rings 29 provides a moment of force that rotates bracket 23 into a position similar to that shown in FIG. 5A to receive the leading edge of the next curved assembly conveyed along delivery conveyor 34 for prepressing.

Apparatus using different diameter rings on parallel shafts has been used for several months with virtually no breakage. It is believed that the configuration of rings using centrally disposed hard rings flanked by softer rings is believed to be one cause of this happy experience. Using larger diameter end rings than center rings disposed along the bottom shaft and larger diameter center rings than end rings disposed along the upper shaft is believed to be another factor for this success. Gradually increasing the space between opposed rings toward the ends of the shafts is believed to be still another factor in improving the efficiency of prepressing. The present invention replaces complicated roll structure with relatively simple apparatus much easier to maintain. In summary, the present invention provides an improved apparatus for prepressing curved glass-plastic assemblies having cross-sag or compound curvature present.

While the illustrative embodiment describing the present invention shows prepressing apparatus wherein a bottom ring is driven, the present invention is equally adaptable for use with systems where all the rings or roll segments are freely rotatable to be driven by frictional engagement by the assembly as the delivery and discharge conveyors move the assembly through the pressing rolls. Also, the rolls can be mounted on roll support structure that may be movably mounted to a support structure in a manner other than pivoting or rigidly supported thereby as is well known in the art.

The form of the invention shown an described in this disclosure represents an illustrative preferred embodiment only. It is understood that various changes may be made without departing from the spirit of the invention as defined in the claimed subject matter which follows.

What is claimed is:

1. Apparatus for pressing a bent laminate comprising two matched compoundly curved glass sheets and a thermoplastic interlayer, said apparatus comprising a pair of roll support members, a pair of radially spaced parallel shafts rotatably mounted between said roll support members in spaced relation to one another, a set of rings having resilient peripheral surfaces mounted along each said shaft in closely spaced relation along its length, the diameter of the rings disposed along one of said pair of shafts being larger at the ends of said one of said shafts and smaller toward the center thereof, the diameter of the rings disposed along the other of said pair of shafts being smaller at the ends of said other of said shafts and larger toward the center thereof, said opposed rings disposed about the central portion of said shafts being harder than the rings disposed about the end portions of said shafts, means for directly driving at least one of said harder rings mounted centrally of one of said shafts, said softer rings being freely rotatable about said shafts, the space between said shafts being so related to the sum of the diameters of opposing rings as to produce a curved line of nipping between opposed sets of rings corresponding to the curvature of a bent laminate transverse to its path of movement, the distance between the outer peripheries of said opposed rings disposed centrally of said shafts being less than the distance between the outer peripheries of said opposed rings mounted at the ends of the shafts.

2. Apparatus as in claim 1, wherein said shafts are disposed with one generally above the other, said rings mounted along the upper of said shafts being arranged with the rings disposed about the end portions of said upper shaft having a smaller diameter than the rings disposed about the central portion thereof, and said rings mounted along the lower of said shafts being arranged with the rings disposed about the end portions of said lower shaft having a larger diameter than the rings disposed about the central portion thereof, whereby the upper configuration of the peripheries of said rings disposed along said lower shaft in the direction of said lower shaft conforms substantially to the configuration of the assembly transverse to its path of movement between said sets of rings.

3. Apparatus as in claim 2, wherein said opposed rings disposed about the central portion of said shafts are cylindrical and at least some of said opposed rings disposed about the end portions of said shafts are frustoconical, said frustoconical rings disposed about said upper shaft decreasing in diameter toward an adjacent end of said upper shaft and said frustoconical rings disposed about said lower shaft increasing in diameter toward an adjacent end of said lower shaft.

4. Apparatus as in claim 2, wherein said relatively hard rings have a hardness of between about 45 and about 50 Shore durometer and said relatively soft rings have a hardness of between about 30 and about 35 Shore durometer.

5. Apparatus as in claim 1, wherein said opposed rings disposed about the central portion of said shafts are cylindrical and at least some of said opposed rings disposed about the end portions of said shafts are frustoconical, said frustoconical rings disposed about said upper shaft decreasing in diameter toward an adjacent end of said upper shaft and said fructoconical rings disposed about said lower shaft increasing in diameter toward an adjacent end of said lower shaft.

6. Apparatus as in claim 1, wherein said relatively hard rings have a hardness of between about 45 and about 50 Shore durometer and said relatively soft rings have a hardness of between about 30 and about 35 Shore durometer.

References Cited

UNITED STATES PATENTS

| | | | |
|---|---|---|---|
| 1,960,580 | 5/1934 | Fraser | 100—176 X |
| 2,525,980 | 10/1950 | Walters | 100—164 |
| 2,673,168 | 3/1954 | Pascoe et al. | 100—172 |
| 2,948,646 | 8/1960 | Richardson | 100—172 |
| 2,982,679 | 5/1961 | Snyder et al. | 100—173 X |
| 2,983,635 | 5/1961 | Richardson | 100—176 X |
| 2,986,193 | 5/1961 | Howell | 29—125 X |

LOUIS O. MAASESL, *Primary Examiner.*